Oct. 28, 1947.    U. LAMM    2,429,827
MEANS FOR INDICATING OR REGULATING THE
TEMPERATURE OF FURNACES OR THE LIKE
Original Filed March 7, 1940
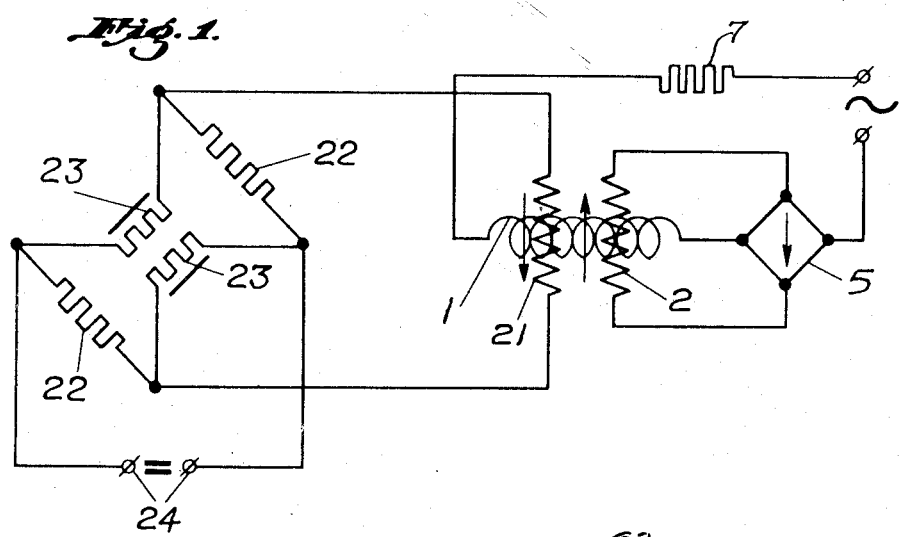
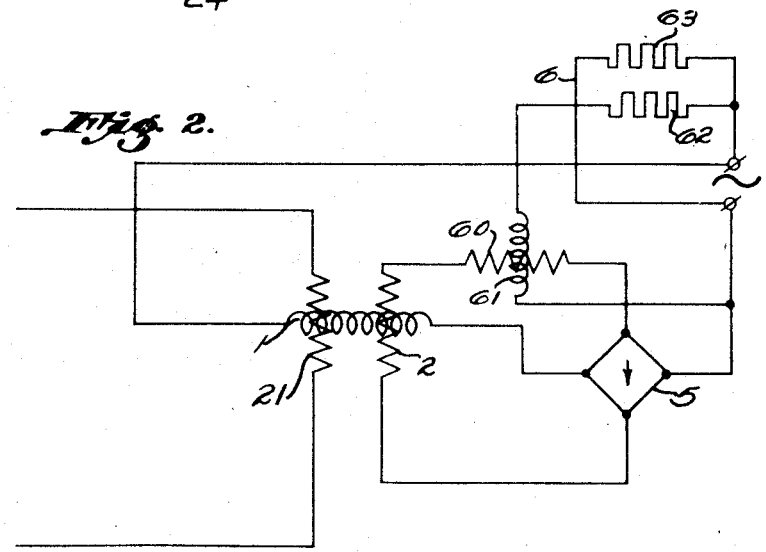
INVENTOR
Uno Lamm
BY
ATTORNEY Patented Oct. 28, 1947

2,429,827

UNITED STATES PATENT OFFICE 2,429,827

MEANS FOR INDICATING OR REGULATING THE TEMPERATURE OF FURNACES OR THE LIKE

Uno Lamm, Ludvika, Sweden, assignor to Allmänna Svenska Elektriska Aktiebolaget, Vasteras, Sweden, a corporation of Sweden Original application March 7, 1940, Serial No. 322,750. Divided and this application April 18, 1942, Serial No. 439,586. In Sweden March 3, 1939

Section 1, Public Law 690, August 8, 1946.

Patent expires March 3, 1959.

1 Claim. (Cl. 236—1)

Direct current saturated inductances may, as is well-known, advantageously be so constructed and connected as to act analogously to relays, over which they have the advantage of operating without any movable parts. The present invention refers to a device which is particularly suitable for operating such a direct current saturated inductance as a thermic relay for control of the temperature of a furnace or similar apparatus which is heated electrically or the heat supply of which is otherwise controlled electrically. The device consists of a resistance which is variable with the temperature and which is included in the circuit of a saturating winding of the inductance so as to saturate or desaturate the latter when the temperature of the apparatus to be heated reaches a certain critical value. According to a preferred form, the heat responsive resistance is included in a Wheatstone bridge connection and the saturating winding in the bridge thereof.

An example of the said preferred form of the invention is illustrated in the accompanying drawing at Fig. 1, and Fig. 2 is a detail view showing a modification.

In Fig. 1 of the drawing, I is an inductance coil having two direct current saturating coils 2, 21. The coil 2 is traversed by the current passing through the said inductance coil after this current has been rectified in a rectifier 5. The coil 21 is connected in a bridge between two opposite corners of a tetragon, two opposite sides of which contain constant resistances 22, while the two remaining sides contain resistances 23, the temperature coefficient of which may be positive or negative, depending on the polarity of the direct current terminals 24, and the temperature of which depends on the temperature of a furnace or of another heating apparatus, the heating of which can be controlled in an electrical way by an apparatus, for instance a heating resistance 7, connected in the alternating current circuit of the inductance coil 1.

Supposing the resistances 23 have, at normal temperature, a lower value than the resistance 22, and that the left one of the direct current terminals 24 is positive, then a current normally flows through the coil 21 in the direction indicated by the arrow. On the other hand, the rectifier 5 may be so arranged that the rectified current therefrom flows through the coil 2 in the direction of the oppositely directed arrow alongside this coil, indicating that the ampere turns of these two coils counteract each other. Such a counteraction generally results in a rather small alternating current traversing the inductance.

If, however, the temperature coefficient of the resistances 23 is positive, the ohmic value of the said resistances will, when a certain temperature is reached, exceed that of the resistances 22, and the current through the coil 21 is then reversed. As soon as it reaches a certain value in the opposite direction, depending on the characteristic of the direct current saturated inductance acting as a relay, the alternating current traversing the latter is raised to a considerably higher value than before and actuates the controlling device 7 to reduce the heat developed in the furnace or apparatus, or to give a warning signal to the man attending to said furnace or apparatus. It is obvious that a negative temperature coefficient of the resistances 23 in combination with a reversal of polarity of the terminals 24 may produce the same result as that now described. Other differential connections known in principle and operating in analogy with that now described may of course also be employed.

Instead of connecting a heat controlling apparatus 7 in the alternating current circuit, as shown in Fig. 1, such an apparatus could be connected in the direct current circuit fed by the rectifier 5, as shown in Fig. 2. Such an apparatus may comprise a direct current winding 60 saturating a reactor 61, which controls the current through a heating resistance 62. Another heating resistance 63 fed from the same alternating current terminals is shown to represent a basic heating resistance, while the current in the additional resistance 62 may be controlled to control the temperature within certain limits.

This application is a division of my co-pending application Serial No. 322,750, filed Mar. 7, 1940, now Patent No. 2,337,253, issued Dec. 21, 1943.

I claim as my invention:

Temperature controlling means, comprising a heating device, electrical means for controlling the heat developed therein, an inductance coil containing iron connected in series with said electrical means, a source of alternating current feeding said coil and means, a direct current winding acting to saturate the iron of said coil, a thermally responsive ohmic resistance forming part of the circuit of said direct current winding and influenced by the temperature of said heating device, and means, including rectifying elements, for additionally saturating said iron in proportion to the alternating current flowing through said coil.

UNO LAMM.

REFERENCES CITED

The following references are of record in the file of this patent:

UNITED STATES PATENTS

| Number | Name | Date |
|---|---|---|
| 1,276,589 | Steinmetz | Aug. 20, 1918 |
| 1,743,737 | Thompson | Jan. 14, 1930 |
| 1,955,322 | Brown | Apr. 17, 1934 |
| 1,996,041 | Emmerling | Mar. 26, 1935 |
| 2,079,466 | Phillips | May 4, 1937 |
| 2,276,822 | Bowman | Mar. 17, 1942 |
| 2,277,849 | Fitz Gerald | Mar. 31, 1942 |
| 2,310,955 | Hornfeck | Feb. 16, 1943 |
| 2,341,526 | Breitenstein | Feb. 15, 1944 |

FOREIGN PATENTS

| Number | Country | Date |
|---|---|---|
| 497,768 | Great Britain | Dec. 28, 1938 |